United States Patent
Nama et al.

(10) Patent No.: US 8,407,257 B2
(45) Date of Patent: Mar. 26, 2013

(54) SYSTEM AND METHOD FOR MUTATING POLYMORPHIC OBJECT COMPONENTS

(75) Inventors: Vivek Nama, Fremont, CA (US); Chandra Mora, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 501 days.

(21) Appl. No.: 12/562,056

(22) Filed: Sep. 17, 2009

(65) Prior Publication Data

US 2011/0066655 A1    Mar. 17, 2011

(51) Int. Cl.
*G06F 7/00* (2006.01)
*G06F 17/30* (2006.01)

(52) U.S. Cl. ........ 707/792; 707/955; 707/960; 715/209; 719/315

(58) Field of Classification Search .................. 707/792, 707/955, 960; 715/209; 719/315
See application file for complete search history.

(56) References Cited

U.S. PATENT DOCUMENTS

| | | | | |
|---|---|---|---|---|
| 5,717,925 | A * | 2/1998 | Harper et al. | 707/999.102 |
| 5,761,684 | A * | 6/1998 | Gibson | 715/210 |
| 6,059,838 | A * | 5/2000 | Fraley et al. | 717/108 |
| 6,401,101 | B1 * | 6/2002 | Britton et al. | 707/999.105 |
| 6,944,851 | B1 * | 9/2005 | Dixon, III et al. | 717/136 |
| 7,051,336 | B1 * | 5/2006 | Brown et al. | 719/316 |
| 2009/0043551 | A1 * | 2/2009 | Russell | 703/6 |
| 2010/0198799 | A1 * | 8/2010 | Krishnan et al. | 707/702 |

* cited by examiner

*Primary Examiner* — Phong Nguyen
(74) *Attorney, Agent, or Firm* — Kilpatrick Townsend & Stockton LLP

(57) ABSTRACT

Embodiments of the present invention provide for techniques for enabling mutation of an instantiated object between multiple underlying object types at run time. The object may alter its behavior from one object type to another at anytime without requiring a new object to be instantiated. The object's behavior may be implemented by other objects which are retrieved at run time, thus disconnecting the direct link between the object's behavior and the object.

19 Claims, 9 Drawing Sheets

SYSTEM AND METHOD FOR MUTATING POLYMORPHIC OBJECT COMPONENTS

BACKGROUND OF THE INVENTION

Embodiments of the present application relate generally to application programs using a database to provide persistent storage of data, and more particularly to applications that can mutate polymorphic object components.

Many application programs, particularly web based application programs, are increasingly designed using an n-tier architecture. In an n-tier architecture, each tier is generally responsible for certain functionality, and the functionality provided by a tier is independent of the other tiers. For example, a typical web application may involve three tiers. The top tier may be exposed to the user, and is typically referred to as the presentation tier. Functionality in the presentation tier can include providing a display on a user's computer browser. The presentation tier may also be responsible for providing forms which a user may use to input data.

An exemplary middle tier may provide verification and validation logic that is used to verify and validate the user's input as provided by the presentation tier, prior to being stored in persistent storage. In addition, the middle tier may extract data from the persistent storage for use by the presentation tier. Typically, the middle tier is implemented using standard object oriented programming techniques. Data values as provided to and from the presentation tier may be represented as attribute values of one or more software objects. Operations on the attribute values may be provided by methods associated with those objects. The middle tier may also contain business logic to operate on the data received from the presentation tier. The software objects will typically provide a mechanism for interfacing with a persistent storage to store attribute values of the software objects in a database.

An exemplary third tier corresponds to persistent storage that may be used to store data. Such persistent storage may be provided in the form of a database. A wide variety of databases are available from numerous vendors, including those provided by the assignee of the present application. A typical relational database may comprise one or more tables, each table consisting of one or more rows and having one or more columns. A logical mapping typically exists between the database table and the corresponding software objects. In a simple scenario, there is a one to one mapping between a single database table and a corresponding software object. Each column may map to an attribute of a software object, while a row may represent a record comprising the complete set of attribute values for the software object.

In a more complex scenario, the data in a set of inter-related tables represent a combined atomic software object. Such a software object may need to be represented by several constituent software objects which may be referred to as software object components. If the relationship is hierarchical in nature e.g. an invoice and its invoiced items, then the corresponding software object components may also need to be designed in a parent-child relationship.

In a different complex scenario, one database table may itself house the data of several similar but distinct software object types. A single database table may contain columns that map to attributes for multiple different object types, each object type containing a different set attributes. Such a scheme is generally referred to as polymorphism. One or more additional attributes, referred to as discriminator attributes, may be included in the object types, and map to a column in the database. The discriminator attributes allow the application to determine the appropriate object type for the data stored in a particular row of the table. A typical design for such an arrangement entails multiple software object components, each representing the various software object types, themselves inheriting from a common parent software object component.

A highly complex scenario could be a medley of both complexities above, i.e. a software object may consist of several software object components arranged in a multi-level deep hierarchy (e.g. parent-child-grandchild-great-grandchild relationship) whereby nodes in each level are further expressed via polymorphic types.

Despite such complexity, a presentation tier may still attempt to provide a quick entry screen for such a complex software object. When creating a new object, users would begin by choosing the type of the top level software object component from the presentation layer. Such a selection may be in the form of choosing a value for a discriminator attribute. The presentation tier may then prompt the middle tier to instantiate a software object that may be utilized to interface with the persistent storage tier. The data values of the attributes of the software object may be stored in one or more tables provided by the third tier. As explained above, the software object may contain logic to ensure that data being entered by the user through the presentation tier is appropriate for the instantiated software object.

Situations may arise where a user has chosen an object of a particular type, and has begun entry of data corresponding to the attributes of that instantiated object. The user may then realize he has chosen an object of an incorrect type. In some cases, the attributes of the incorrectly chosen software object may also be applicable to the software object of the correct type. However, the software object of the incorrect type selected by the user cannot simply be mutated to an object of the correct type. In order to store the data in the object of the correct type, the user would generally be required to discard all of the data that has already been entered for the object of the incorrect type, create an object of the correct type, and then reenter the data for the attributes of the object of the correct type that is newly instantiated.

For example, a user may specify to the presentation tier that he or she wishes to create an invoice object. The middle tier may then instantiate an invoice object. The user may begin entering certain attributes, such as an address of a business that should receive the invoice. At some point, the user may realize he did not intend to create an invoice object, but rather intended to create a different type of object, such as a freight invoice object. However, the invoice object that has already been instantiated would be unsuitable for use as a freight invoice object, despite the fact that both invoices would share attributes such as the address of the business. The user would be forced to start over, and specify a freight invoice object and re-enter data for the freight invoice object.

In other situations, the user may not know the correct type of object to create at the time of creation. For example, a sales representative who is on the road may wish to record all of his expenses using a device such as a personal digital assistant. At the time of entering the expense data, the sales representative may not know the specific type of object to be used for storing the expenses. Accordingly, the user may use an object of a temporary or generic type for storing the expenses. The expense data is thus stored in objects instantiated of a generic type. These would then have to be converted to objects of the correct data type in order for the data stored by the temporary/generic objects to be synchronized with data in a database. When the sales representative is back in the office, he or she may be in a better position to classify each temporary or generic instantiated object to an object of the correct type.

However, just as discussed above, once a generic expense object has been instantiated, it is not possible to simply mutate it to an object of the correct object type. The user is forced to create an object of the correct type and reenter the data for the attributes of the object of the correct type.

BRIEF SUMMARY OF THE INVENTION

The foregoing, together with other features and embodiments will become more apparent when referring to the following specification, claims, and accompanying drawings.

Embodiments of the present invention provide for techniques for enabling mutation of an instantiated object between multiple underlying object types at run time. The object may alter its behavior from one object type to another at anytime without requiring a new object to be instantiated. The object's behavior may be implemented by other objects which are retrieved at run time, thus disconnecting the link between the object's behavior and the object.

In one embodiment, a computer readable storage medium storing a plurality of instructions for controlling a processor is provided. The plurality of instructions may include instructions that cause the processor to create an entity object that comprises a set of attributes and behaviors. The set of attributes may include a superset of all attributes of a plurality of object types. The set of behaviors may further include a superset of all behaviors of the plurality of object types. The set of attributes may further include a discriminator attribute that determines an object type of the plurality of object types that the entity object will behave as. The plurality of instructions may also include instructions that cause the processor to set a value for the discriminator attribute based on the object type that the entity object should behave as. The plurality of instructions may further include instructions that cause the processor to, in response to a request for the entity object to exhibit a behavior, obtain a reference to a helper object. The helper object may implement the behavior that enables the entity object to behave as an object of the object type determined by the discriminator attribute value. The plurality of instructions may further include instructions that cause the processor to execute computer code of the helper object that implements the requested behavior of the entity object for the determined object type.

In another embodiment, a computer implemented method for accessing a data store is provided. The method for accessing a data store may include instantiating an entity object in a server computer. The entity object may include a plurality of attributes. The plurality of attributes may include a superset of all attributes of a set of underlying object types. The plurality of attributes further including a discriminator attribute having a value. The value may determine which type of the underlying object types the entity object should behave as. The method may further include retrieving an instance of a helper object for the underlying object type. The instance of the helper object may be determined by the value of the discriminator attribute. The method may further include passing the entity object to the helper object. The method may further include invoking at least one method of the helper object to store values for plurality of attributes of the entity object into the data store.

In yet another embodiment, a system comprising a memory and a processor coupled to the memory is provided. The processor may be configured to create an entity object that comprises a set of attributes and behaviors. The set of attributes may include a superset of all attributes of a plurality of object types. The set of behaviors may further include a superset of all behaviors of the plurality of object types. The set of attributes may further include a discriminator attribute that determines an object type of the plurality of object types that the entity object will behave as. The processor may be further configured to set a value for the discriminator attribute based on the type of object that is created. The processor may further, in response to a request for the entity object to exhibit a behavior, obtain a reference to a helper object. The helper object may implement the behavior of the entity object for the object type determined by the discriminator attribute. The processor may be further configured to execute computer code of the helper object that implements the requested behavior of the entity object for the determined object type.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide for techniques for enabling mutation of object types. In one embodiment, a mutating polymorphic entity object is provided that may be used in a middle tier of an n-tiered application, wherein a middle tier is any tier between a presentation tier and a persistent storage tier. The mutating polymorphic entity object may be an object that may behave as one of a plurality of underlying object types. The mutating polymorphic entity object may alter its behavior to behave as any of the underlying object types at any time.

A presentation tier may interface with the middle tier to provide/receive data from a user or an automated system. The data may be representative of a number of different underlying object types. The mutating polymorphic entity object may be a single object type that is capable of behaving as any of the underlying object types, based on the data. The mutating polymorphic entity object is also able to switch its behavior between the different object types without requiring a new instantiation of the mutating polymorphic entity object. The mutating polymorphic entity object may also interface with a persistence tier to store/retrieve data from persistent storage.

Figure 1:
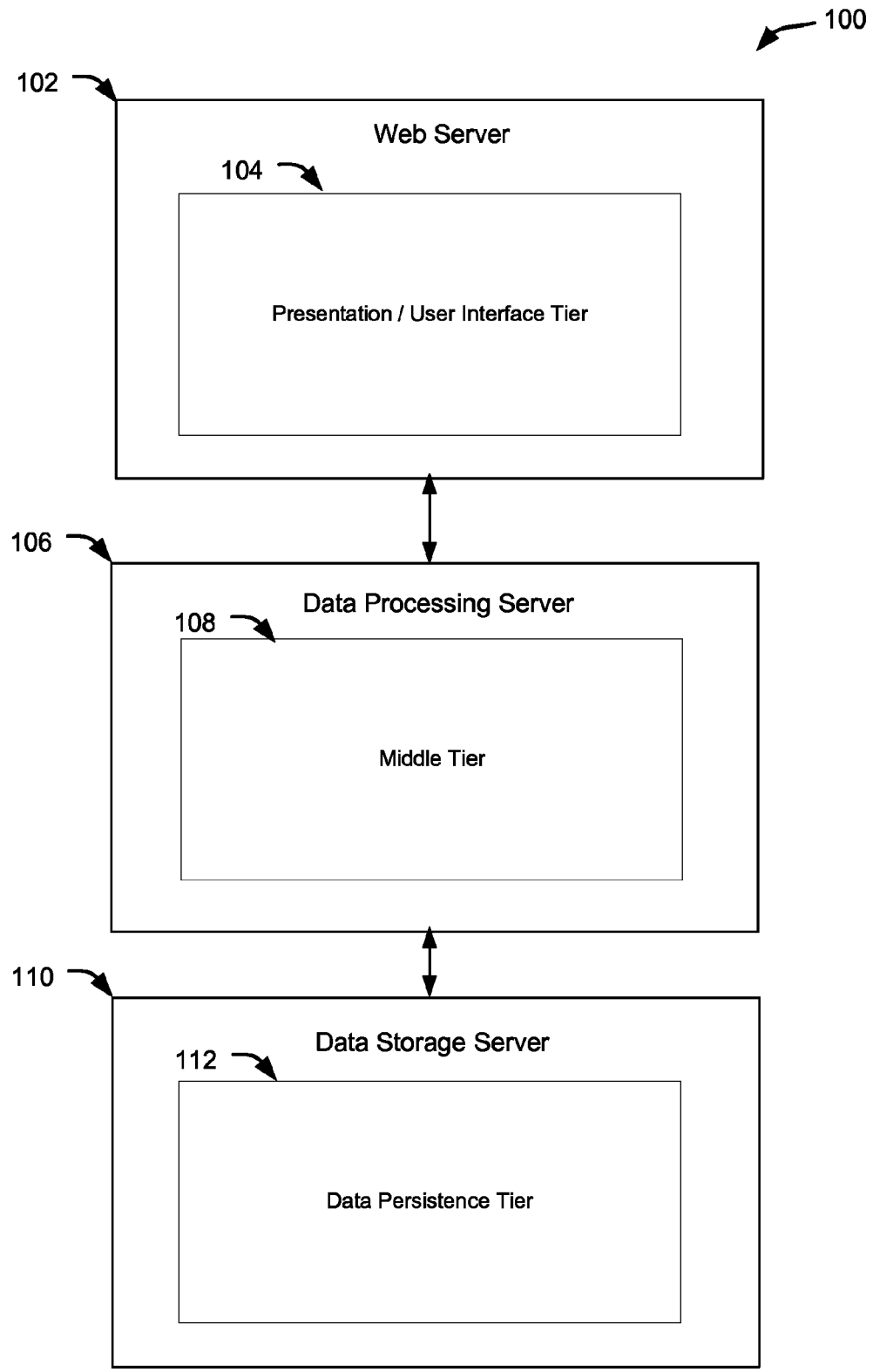
FIG. 1 depicts a simplified block diagram of a system that may incorporate an embodiment of the present invention.

FIG. 1 depicts a simplified block diagram of a system that may incorporate an embodiment of the present invention. The system 100 may include a web server 102 that hosts various web pages. Some of these web pages may allow a user to enter data that will eventually be stored in a persistent storage. In general, the web server 102 may house what may be referred to as the presentation tier 104 of an application. The presentation tier 104 may be responsible for interfacing with external entities, such as users or other automated systems. In a typical scenario, the web server 102 may present a web page to a browser running on a user's computer (not shown). This web page may contain forms or other fields to allow a user to enter data. One example of such a web page may be a page allowing a user to enter data related to expense reports for an accounting application.

Although the exemplary presentation tier 104 that has been presented is implemented by web server 102 hosting web pages, embodiments of the invention are not limited to web pages or web servers. Any other mechanism for soliciting information from or providing information to a user or automated system may be considered as a presentation tier 104. For example, an application running on a user's desktop computer may comprise a presentation tier 104 implemented without using a web server 102. Other examples of presentations tiers can include automated voice response systems, bar code readers, or the like. Any application that may interface with a user or automated system to receive or supply data may provide a presentation tier 104. For simplicity, for the remainder of this disclosure, the term presentation tier is used to refer to a layer, typically implemented in software, that is configured to receive input data from a user and to provide the received input data to one or more lower tiers for processing. However, it should be clear that the opposite flow of data, from the lower tiers to the presentation tier 104 is also contemplated. Furthermore, the remainder of this disclosure will refer to a user as performing various actions. This is for purposes of simplicity only, and does not limit the disclosure to human users alone. In some embodiments, the user may be another automated computer system.

In some embodiments of the invention, once the presentation tier 104 has received data that has been input by the user, the data is sent to a data processing server 106. Although any mechanism would be suitable to send the data, some exemplary mechanisms may include HTTP requests (both GET and POST types), formatting the data into an XML document and passing to the middle tier 108, remote and local procedure calls, or any other mechanisms that would be known to a person of skill in the art. The data processing server 106 may provide a middle tier 108 for interfacing between the presentation tier 104 and persistent storage 112. Another function of the middle tier 108 may be to verify and validate data that is received from the presentation tier 104 prior to storage of the data in the persistence tier 112.

The middle tier 108 may be responsible for ensuring that the data entered by the user is valid and suitable for its intended use. In other words, the middle tier 108 may be responsible for ensuring the data entered is correct and complete, prior to passing to data persistence tier 112 for storing the data in a persistent storage. The middle tier 108 may also implement business logic to operate on the data. The middle tier 108 may be implemented in any number of ways, such as CGI (Common Gateway Interface) programs, Java applications, or other applications that are based on object oriented programming methodologies.

Before returning to the description of the invention, a brief summary of the terms as they will be used throughout the remainder of the disclosure may be helpful. A class refers to the definition of a collection of attributes and methods, as would be well understood by a person of skill in the art of object oriented software programming. The attributes can be of any available data type. The methods may be public or private. A public method may be invoked by an external entity, while a private method may only be invoked by a method of the class. An object is defined as an instantiated class. Many object instances may be instantiated from a class. Other terms such as inheritance, inheritance hierarchies, overridden methods, and the like, are used to refer to the standard concepts in object oriented programming, and would be known to a person of skill in the art.

The middle tier 108 may instantiate a mutating polymorphic entity object to process the data received from the presentation tier 104. A mutating polymorphic entity object may also be referred to as an entity object for the remainder of this disclosure. The entity object may comprise attributes that are a superset of all the attributes of all of the object types underlying the entity object. Although the entity object may comprise all possible attributes, each and every attribute may not be applicable for every underlying object type. An example of an entity object will be further described below, with reference to FIG. 2 and FIG. 3.

The entity object may also contain a number of public methods that allow the entity object to process the attributes contained therein. The public methods may comprise methods for manipulating the attributes of the entity object within the middle tier 108. For example, a public method may be provided that will instruct the middle tier 108 to store the data values corresponding to attributes of the entity object in persistent storage. Public methods of the entity object are generally used to provide access to behaviors of the entity object that are required for the middle tier to operate on the entity object.

The entity object may also contain private methods that may be invoked only by other methods within the entity object. Private methods may be used to limit access to the internal behaviors of the entity object by the middle tier 108. By limiting access to methods that affect the internal behavior of the entity object, the entity object is able to operate independently of the rest of the middle tier. For example, the middle tier may invoke a public method to perform an operation on the entity object, without needing to know the particular object type the entity object is currently behaving as. The public method may then invoke a private method that is specific to the particular objet type being represented to act on the request from the middle tier.

In one embodiment, the set of private methods associated with an entity object includes a private method to retrieve an instance of a helper object. A helper object may be an instance of a helper class that contains methods for processing the attributes relevant to the particular object type the entity object is currently behaving as. The helper object may be responsible for verifying and validating the attributes and attribute values that may have been received from the presentation tier 104 in addition to applying business logic to the entity object. Typically, there will be one instance of a helper object for each particular underlying object type. Helper objects may be instantiated utilizing a singleton design pattern in the middle tier 108. Helper objects will be further described below, with respect to FIG. 6.

The entity object, through the use of a helper object, may pass its attribute values to a data storage server 110 for persistent storage. Typically, the data storage server 110 may be coupled to a relational database to provide persistent storage, which may be represented as the data persistence tier 112. However, embodiments of the invention may make use of any other suitable forms of data persistence tier 112. For example, object-relational databases, flat files, file structures, or any other mechanism for persistently storing data may be used as the data persistence tier 112. The middle tier 108, through the use of entity objects and helper objects, may interface with the data persistence tier 112 to allow for persistent storage of the data values for attributes of the entity object.

Although the above description has been presented in terms of a presentation tier 104, a middle tier 108, and a data persistence tier 112, operating on a web server 102, a data processing server 106, and a data storage server, 110, embodiments of the invention are not intended to be so limited. For example, all of the tiers may be implemented on a single server or any other number of servers. In some embodiments, multiple servers may be used for each tier. A person of skill in the art will recognize that the tiers may be implemented in any number of ways.

Figure 2:
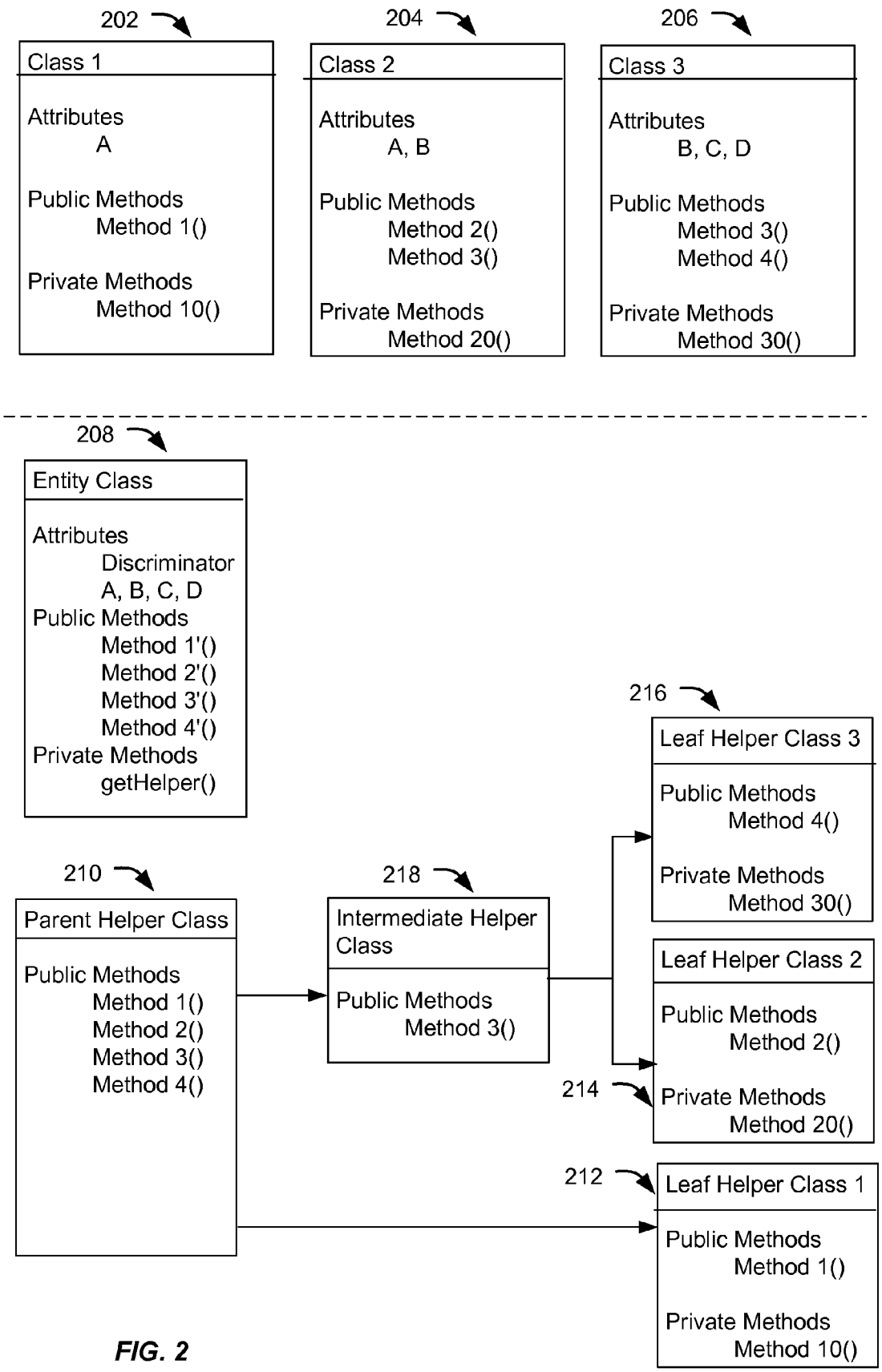
FIG. 2 depicts an embodiment of the present invention in a design time context.

FIG. 2 depicts an embodiment of the present invention in a design time context. In order to design a polymorphic entity object that is capable of altering its behavior between multiple object types at run time, a designer may first identify the set of objects that will be allowed to mutate from one type to another. As this process occurs during design time, the objects may be represented by their class definitions. As would be known to a person skilled in the art of object oriented programming, an object is a class that has been instantiated in the runtime system. For the remainder of this disclosure, a reference to an object of a particular type will mean a software object that is instantiated according to its corresponding class definition. Thus, for example, an entity object will refer to an object that is instantiated based on the entity class definition.

In the design context as presented in FIG. 2, three example classes 202, 204, 206 may be identified by the designer as classes whose instantiated objects should be allowed to alter their behavior from one class to another, without requiring a new object to be instantiated. As can be seen in the figure, each class may define attributes, which may be used to store data values once instantiated by the runtime system. Each class may also define public methods, which may be functions for use by entities external to the instantiated object to operate on the object. For example, the middle tier would interact with an instantiated object by invoking a public method of the instantiated object. The class may also contain private methods. Unlike public methods, private methods provide functions that may only be invoked from within the instantiated object. Private methods may typically be used to provide functionality for the object that does not need to be exposed to external entities.

Continuing with the present example, class 202, which will be referred to as Class 1, contains a single attribute, A. Class 1 also contains a single public method, Method 1( ), and a single private method, Method 10( ). Class 204, which will be referred to as class 2, contains two attributes, A and B. Class 2 contains two public methods, Method 2( ) and Method 3( ), and one private method, Method 20( ). Class 206, which will be referred to as class 3, contains three attributes, B, C, and D, two public methods, Method 3( ) and Method 4( ), and one private method, Method 30( ). For purposes of this description, attributes are referred to generally, such as by the letters A, B, C, and D. This is for purposes of identification only. As would be well known to a person familiar with object oriented programming techniques, an attribute may be of any allowable data type, including a data type represented by another class. Furthermore, certain attributes may be present in more than one class. For example, attribute A exists in both class 1 and class 2.

Each of class 202, 204, and 206 may also contain public methods that allow interaction with objects that are instantiated from that class. In the present design example, class 1 contains method 1( ) which provide a way to interact with the object. For example, Method 1( ) may provide functionality for the presentation tier to request that the object store the data values for its attributes into persistent storage. Similar to attributes that may be the same between classes, public methods may also be the same between classes. For example, class 2 and class 3 both contain methods identified as Method 3( ). For purposes of this example, similarly identified methods indicate functionality that is present in method. However, as should be clear to a skilled designer, such a situation leads to great difficulty in maintenance and development of the classes. For example, if a change to Method 3( ) is required, a designer must remember to make the change in both the class 2 and class 3 definitions. If the designer remembers to alter both classes, this leads to a duplication in effort. If the designer forgets, this leads to multiple versions of methods that should be providing the same functionality. Embodiments of the present invention advantageously overcome such issues, as will become more clear as this example continues.

Each class 202, 204, and 206 may also contain private methods that are only accessible by an instantiated object of the class. Typically, private methods may be used to provide functionality that is needed by the instantiated object, but is not necessary to be exposed outside of the object. This allows designers of classes to alter internal functionality without having an impact on the external entities that may interface with objects instantiated from the class. The use of private methods to hide the actual implementation within an object from external entities would be known to a person of skill in object oriented programming.

Once the designer has identified the set of classes whose instantiated objects will be allowed to mutate from one class to another, the designer may define a class that encompasses all of those objects. Such a class is depicted in FIG. 2 as an Entity Class 208. Entity Class 208 will be designed to contain a superset of all attributes present in the identified set of classes. In the present example, there have been four attributes, A, B, C, and D, that were defined in the identified set. Entity class 208 will contain each of those attributes. In addition, an attribute that will be referred to as a discriminator attribute is defined. The discriminator attribute may be used in the runtime system to determine the behavior of an instantiated object. In other words, the discriminator attribute may contain a value that defines the type of object the entity object should behave as. This operation will become more clear in reference to FIG. 3. Although the discriminator attribute is presented as an individual attribute, this is for purposes of clarity only. In some embodiments, the discriminator may actually be a combination of one or more existing attributes.

In addition to defining attributes for the entity object, the designer will also define a set of public methods for the entity object. As explained above, public methods allow for external entities to interact with the object, once instantiated. The designer may provide a public method that corresponds to each public method present in the identified set of classes. As shown, entity class 208 provides public methods 1'-4' that correspond to public methods 1-4 present in the identified set of classes. Public methods 1'-4' will typically contain method signatures that are the same as the method signatures of the corresponding method in the indentified set of classes. Because the method signatures of the public methods are the same, external entities that invoke the method do not need to be aware that they are dealing with a polymorphic entity. As far as the remainder of the system, such as the middle tier, is aware, an instantiated entity object behaves exactly the same as if an object of the underlying class was instantiated.

The public methods 1'-4' will typically not implement any actual functionality. Instead, public method 1'-4' may delegate the functionality that was provided by the method in the underlying class to a helper class. Helper classes will be described further below. In order to determine the correct helper class to use to provide the necessary functionality, the designer may provide a private method that will be used to determine the appropriate helper class. In this example, the private method getHelper is provided by entity class 208. The getHelper method may be used to determine which helper class should be used to provide the functionality that was originally present in the underlying class. For example, the getHelper may evaluate the discriminator attribute to determine the type of class an instantiated object should behave as, and return the appropriate helper object that is instantiated from the appropriate helper class. Once the appropriate helper class is retrieved, the appropriate method of the helper class may be invoked to provide the functionality of the underlying class.

The designer may then define the helper classes. In FIG. 2, the designer may define a parent helper class 210. Parent helper class 210 may contain public methods that maintain the method signatures of all the corresponding methods in the underlying class definitions. In the present example, Classes 202, 204, and 206 provide public methods 1-4. Each of these methods may have a corresponding public method in the parent helper class 210. However, it should be noted that the corresponding method in the parent helper class may not actually provide any functionality, and could be merely a stub function. The reason for providing a stub function in the parent helper class is that at compilation time, the actual helper class whose methods will be invoked to provide functionality is not known, as this will be determined by the getHelper function utilizing the discriminator value. At compilation time, the compiler will produce an error if every referenced symbol is not defined. The stub function allows compilation to proceed without errors because a method whose signature matches a referenced method is defined. The compiler need not know that the method that will actually be invoked at runtime is not that which was used at compilation time.

The designer may also define children helper classes that provide the functionality of the underlying classes. For example, leaf helper class 1 provides a public method 1( ) that may contain the functionality that was present in method 1( ) of class 1. The functionality that was present in private method 10( ) of class 1 may also be provided in leaf helper class 1.

As part of the design of the children helper classes, the designer may note that some functionality that was provided by the underlying classes is common between more than one class. As mentioned briefly above, this commonality may result in duplication of code, and makes maintenance of the code much more difficult. Embodiments of the present invention advantageously resolve this situation by allowing the designer to determine methods that are common, and rather than implementing those methods at the leaf helper class level, implementing those methods at an intermediate level, in an intermediate class 218. The leaf helper classes may then extend the intermediate class 218, thus inheriting the common functionality. Although the concept of intermediate helper classes is presented in terms of a parent-intermediate-leaf class hierarchy, embodiments of the invention are not so limited. Any number of intermediate classes are also contemplated.

In the present example, class 2 and class 3 both provide the public method 3( ). Rather than implementing method 3( ) in leaf helper classes 214 and 216, the designer may implement the method in intermediate helper class 218. Leaf helper classes 214 and 216 may then extend the intermediate helper class 218, and thus will inherit the functionality provided by method 3( ). As such, the code need not be duplicated in the leaf helper classes 214 and 216. Furthermore, if changes are required in the common functionality, the changes can be made in the intermediate helper class 218 only, and these changes will be inherited by the leaf helper classes.

It should be noted that the helper classes are stateless, as they do not contain any attributes in which to hold a state. This is advantageous for the purpose of the helper classes following a singleton design pattern, in which only one instance of an object for a particular helper class will be instantiated, regardless of how many instances of entity objects are instantiated. The singleton design pattern for helper objects will be described in further detail below, however for now it is sufficient to note that the singleton design pattern advantageously results in reduced memory usage and reduces the amount of processing overhead required to instantiate helper objects.

Figure 3:
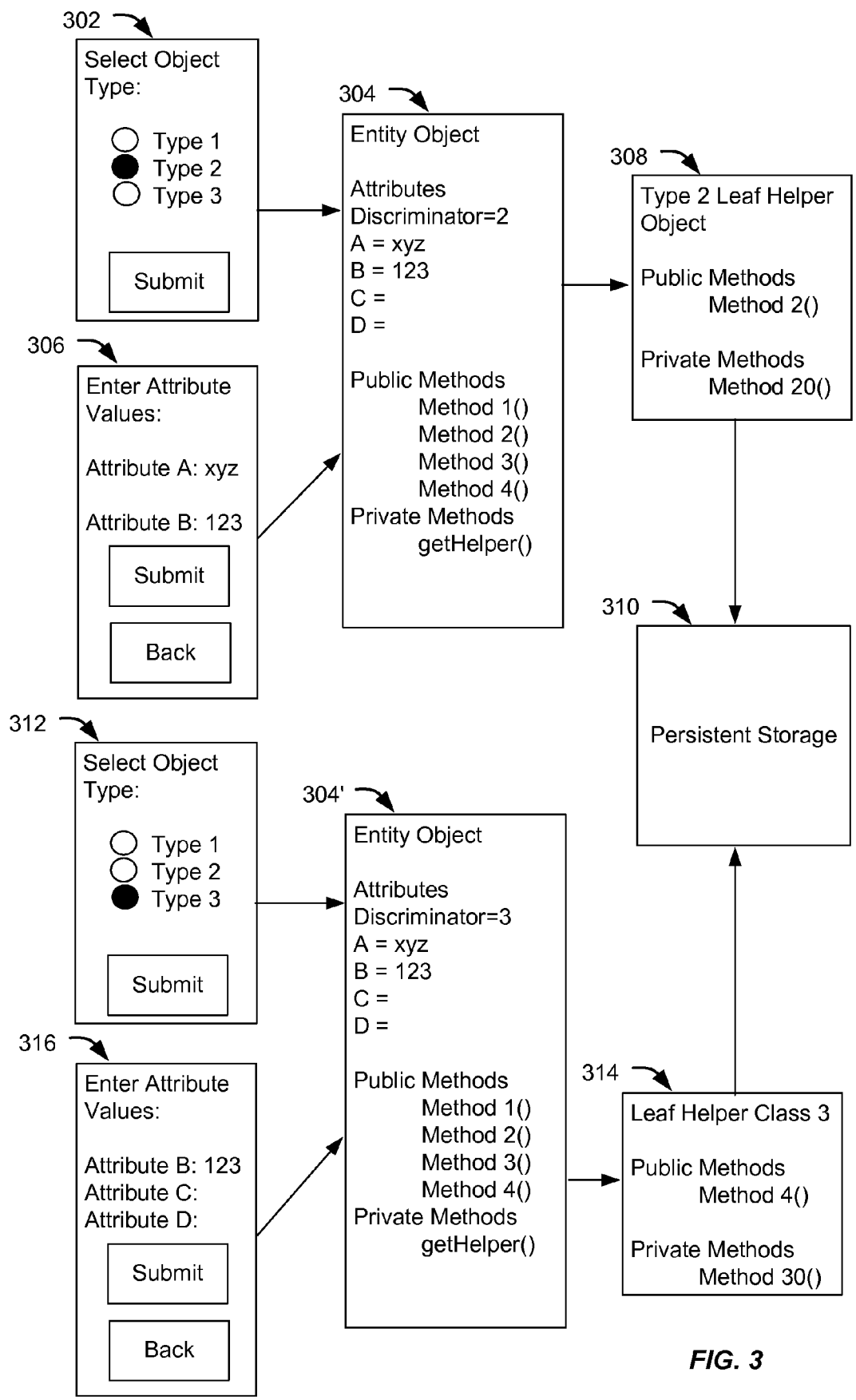
FIG. 3 depicts an embodiment of the present invention in a run time context.

FIG. 3 depicts an embodiment of the present invention in a runtime context. A user may be presented with an input screen 302 from the presentation tier that allows the user to select the type of object that should be created in the middle tier. Although this example explicitly requests the user to specify the type of object that should be created, this is for purposes of simplicity of explanation. In an actual application utilizing embodiments of the present invention, the selection of a type of object to create may relate more closely to the purpose of the application. For example, if the application was an application for entering invoices, the user may be prompted to select the type of invoice he wishes to create. The user may actually have no knowledge about the underlying software, or the fact that an object will be instantiated. What should be understood is that based on the user's input, an object is instantiated in the middle tier.

User input screen 302 depicts the user as having selected an object of type 2 should be created. In response to this selection, the presentation tier may utilize the middle tier to instantiate an object that is defined by the entity class, which will be referred to as en entity object 304. When instantiating the entity object, the presentation tier in some embodiments may specify that the object should be of the type 2 variety. The entity object may then store a value in the discriminator attribute of the entity object to indicate it is of the type 2 variety. In the present example, this is depicted by storing the value 2 in the discriminator attribute of the entity object.

The user may then be presented with an input screen 306 in order to enter data values for attributes that are needed for a type 2 object. In some embodiments, the presentation tier may invoke a method of the entity object to determine which attribute values are required for the specified object type. For example, Method 2 ( ) may be a method that is invoked by the presentation tier to determine which attributes are required for a type 2 object.

However, as explained with respect to FIG. 2, the methods of the entity object typically contain no functionality to operate on an invocation of the method. Rather, the public methods of the entity object may invoke a private method of the entity object to determine the proper helper object to utilize to process the request. In the present example, when method 2( ) of the entity object is invoked to determine the required attributes for a type 2 object, method 2( ) may invoke the getHelper( ) method to determine the proper helper object to utilize. In this example, the getHelper method may evaluate the discriminator attribute of the entity object 304 to determine that this entity object should behave as a type 2 object. As such, the getHelper ( ) method may determine if a type 2 leaf helper object already exists within the middle tier, and if so may return the instance of the type 2 leaf helper object. If the instance of the type 2 helper objet does not exist, the getHelper( ) method may create an instance of it. As has been mentioned before, helper objects may be utilized using a singleton design pattern. The singleton design patterns will be described further below, but for now it will suffice to say that a maximum of one instance of a leaf helper object will exist within the middle tier, regardless of how many entity objects may utilize the single instance of the leaf helper object.

Once the proper instance of the leaf helper object has been obtained, the public method of the entity object may invoke the corresponding public method of the leaf helper object in order to operate on the entity object. The entity object may pass itself to the leaf helper objet as a parameter, such as a 'this' parameter. The reason for this will be explained further below with respect to the singleton design pattern. The corresponding method 2( ) of the leaf helper object may provide functionality such as determining which attributes are required for a type 2 object. As defined with respect to FIG. 2, a type 2 object has attributes A and B. Method 2( ) of the leaf helper object may return this information to the presentation tier, which may then provide the user with an input screen 306 which may prompt the user to enter data values for the attributes A and B of a type 2 object. In the present example, the user has specified the values xyz for attribute A and 123 for attribute B. These data values may be stored in the corresponding attributes in the entity object. Upon clicking a submit button, or some other similar step, the entity object may be instructed to store the attribute values in persistent storage 310.

However, at some point, the user may have discovered that he entered an incorrect value for the type of object that should be created. For example, instead of specifying a type 2 object, the user may have intended to specify a type 3 object. Screen 312 indicates a situation where the user has incorrectly specified that a type 2 object should be created in screen 302, but now wants the object to behave as a type 3 object. In prior systems, this change would require deletion of the type 2 object, with a corresponding deletion of any information already entered by the user. Then a new type 3 object would be instantiated, and the user would need to start entering data from the start, including any data that he already entered.

Embodiments of the present invention advantageously resolve this situation through the use of Entity Objects that are capable of switching their behavior from one object type to another. When the user changes the type of object to a type 3 object in screen 312, the entity object 304' may simply have its discriminator attribute value altered to change the entity objects behavior. It should be understood that entity object 304 and 304' are actually the same object, with object 304 depicting the values when the object was specified as a type 2 object, and object 304' depicting the values after the user changed the object type to a type 3 object. No new instantiation of the entity object is required.

Just as above, the presentation tier may invoke a method of the entity object 304' to determine which attributes are needed for a type 3 object. Again, just as above, the method of the entity object may invoke the getHelper( ) method to determine the appropriate leaf helper object to obtain. However, because the getHelper( ) method uses the discriminator value to determine the appropriate helper object, now that the discriminator value is set to a type 3 object, the type 3 helper object 314 will be obtained. Again, as above a method of the type 3 helper object may be utilized by the presentation tier to determine that the attributes B, C, and D are required for a type 3 object.

In screen 316 the user is prompted to enter values for attributes C and D. However, the user had previously provided a value for attribute B, which was stored in the entity object. Thus, this value is not lost when the discriminator value of the entity object was changed. Rather, any attribute values that are already defined may remain, relieving the user of having to re-enter data values that he has already entered. As such, the entity object is advantageously able to alter its behavior to that of any of the underlying object types, without having to be re-instantiated. Because all of the functionality for specific behaviors is delegated to the helper objects, changing which helper object is invoked completely alters the behavior of the entity object. As the correct helper object is determined at run time based on the discriminator attribute value, changes to the discriminator attribute value can be made at will, and the object will immediately begin behaving as the new type. Because the entity object contains a superset of all possible attributes of the underlying objet types, attribute values that were previously defined may remain defined, even when the entity object's behavior is altered between types.

It should be noted that entity object 304' currently has a value xyz defined for attribute A. However, attribute A is not a valid attribute for a type 3 object, as is depicted in FIG. 2. There is the potential for this to lead to inconsistency in the persistent storage 310 if a value for an attribute that is not applicable to a particular object type is stored. However, embodiments of the present invention advantageously provide for an attribute relevancy framework that alleviates this situation. The attribute relevancy framework will be explained in further detail below.

Figure 4:
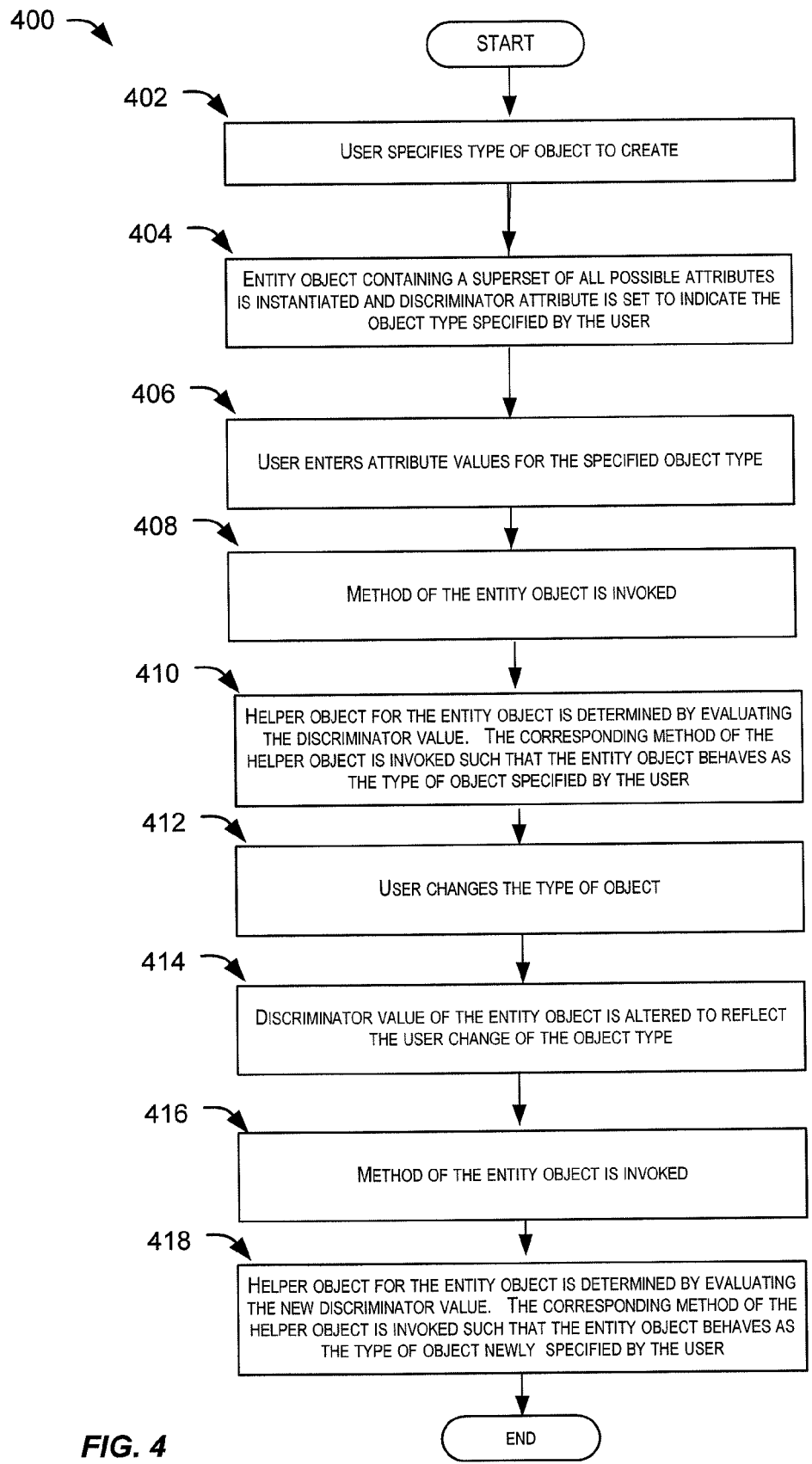
FIG. 4 depicts a simplified flowchart of an entity object altering its behavior.

FIG. 4 depicts simplified flowchart of an entity object altering its behavior. The process 400 may begin at step 402, wherein a user specifies a type of object to create. As explained above, the user may not actually be aware of the fact that he is creating an object, but rather performs some action that causes an object to be generated within the middle tier. The user himself need not be aware that his selections caused an object to be created.

At step 404, an entity object may be instantiated based on the class definition that defines the entity object. The entity object may contain a superset of all attributes that are possible in all of the underlying object types that the entity object can mutate between. Furthermore, the entity object may contain a discriminator attribute whose value may determine the type of object the entity object should behave as. The value of the discriminator attribute may be set based on the input provide by the user in step 402, to indicate the type of object this entity object should behave as.

At step 406, the user may enter values for the attributes of the instantiated entity object. Typically, these will be values for attributes that are applicable to the particular type of object that was specified by the user. At step 408, a method of the entity object may be invoked. However, as explained above, methods of the entity object will typically not contain any code for providing the requested functionality. Rather, the methods of the entity object will delegate such functionality to helper objects corresponding to the object type that the entity object is currently behaving as. This process is explained in step 410.

At step 410, the helper object is determined by evaluating the discriminator value that was originally set in step 404. Based on this discriminator value, a singleton helper object for the object type specified by the discriminator attribute is retrieved. The helper object will typically contain methods that provide the functionality of the particular object type that the entity object is behaving as. Thus, the behavior of the entity object is entirely determined by the particular helper object that is being used to operate on the entity object.

At step 412, the user may decide to change the type of object the entity object should behave as. This is accomplished by changing the value of the discriminator attribute of the entity object to reflect the change. A method of the entity object may then be invoked at step 416.

At step 418, just as in step 410, the entity object may retrieve a helper object to actually provide the functionality for the method that was invoked at step 416. The helper object is once again determined by evaluating the discriminator attribute. However, at step 414, the discriminator attribute was altered to reflect the user's desire to change the type of object the entity object will behave as. As such, at step 418, the helper object that is retrieved is based on the run time value of the discriminator attribute. An entirely different helper object than the one in step 414 may be retrieved. Accordingly, the behavior of the entity object will now be based on the newly determined helper object, and not that which was determined in step 414. Thus, the behavior of the entity object can be switched to any on the underlying object types by simply altering the value of the discriminator attribute.

Figure 5:
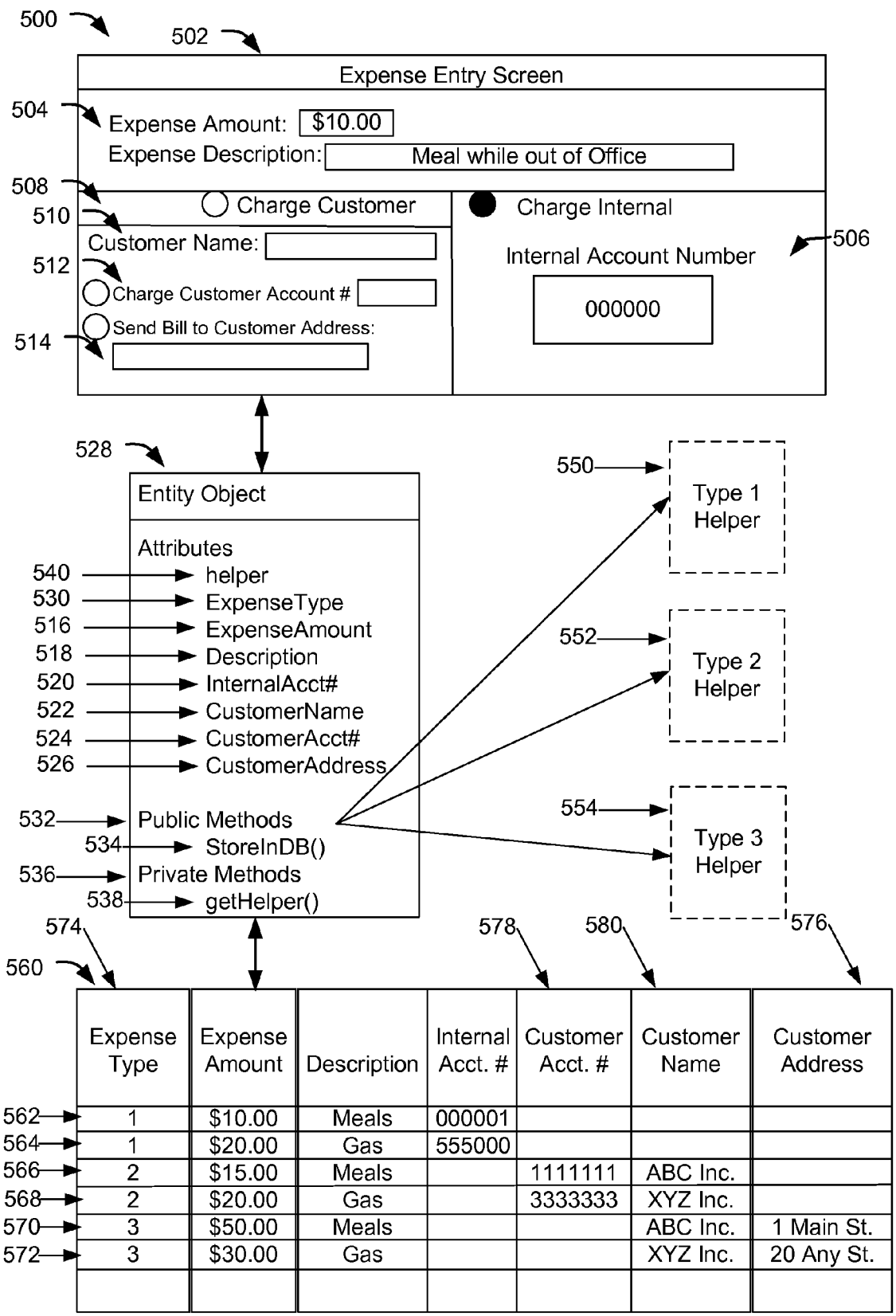
FIG. 5 depicts an exemplary application utilizing aspects of the present invention.

FIG. 5 depicts an exemplary application utilizing aspects of the present disclosure. System 500 is an exemplary simplified tiered application for the entry and storage of expenses. The exemplary application presented in system 500 is intended for the purposes of explanation of the invention, and is not intended to limit the invention to this particular application alone. It would be clear to one of skill in the art that aspects of the present invention are applicable to any number of applications that use a multi tiered architecture.

System 500 may present a user with an interface screen 502. The interface screen 502 can take any number of forms, such as a web page sent from a web server to a browser on a user's computer or an application that runs directly on the user's computer. In any case, the particular form of the user interface screen 502 is unimportant, and is intended to depict an exemplary presentation tier. In this exemplary presentation tier, the user may be prompted to enter data related to an expense. For example, the user may enter the amount and type of the expense 504. The user may also be asked to specify how this expense should be charged. For example, the user may select that this expense should be charged internally to the corporation, and specifies an internal account number to charge 506. In the alternative, the user may specify that a customer 508 should be charged for the expense. If the customer 508 is to be charged for the expense, the user may be requested to enter the customer name 510. The user may then be requested to enter a customer account number 512 if the customer account is to be charged. Alternatively, the user may be instructed to enter a customer address 514, if the customer should be sent a bill.

From this example, there are three types of expense entries that may exist, with some data that is common to all three types, some that is common to two types, and some that only applies to an individual type. The first type of expense entry corresponds to an expense that should be charged internally. This expense entry contains the attributes of ExpenseAmount 516, Description 518, and InternalAcct#520. The second type of expense entry, for an entry that should be charged to a customer account, contains the attributes ExpenseAmount 516, Description 518, CustomerName 522, and CustomerAcct#524. The third type of expense entry, for an entry that should be billed to a customer, contains the attributes ExpenseAmount 516, Description 518, CustomerName 522, and CustomerAddress 526.

Reviewing the attributes of the three types of expense entries presented in this example, it should be noted that some attributes, such as ExpenseAmount 516, are applicable to all three types of entries. Other attributes, such as CustomerName 522, are only applicable to entries that will be charged to a customer. Certain attributes, such as a CustomerAcct#524 are only applicable if a customer account is to be directly charged. It should also be noted that some attributes that are relevant to one type may not be relevant to another type. For example, if an expense is to be charged internally, the attributes related to a customer are irrelevant. Embodiments of the invention may provide a relevance framework, which will be discussed further below, to ensure that only relevant attributes are maintained.

In an embodiment of the invention, entity object 528, may be an instance of a mutating polymorphic entity class. Entity object 528 may contain a superset of all attributes 516, 518, 520, 522, 524, 526 that may be sent to the entity object from the presentation tier 502, even though each attribute is not relevant to each particular type, of an expense. An object type is the set of attributes and corresponding set of methods available to operate on those attributes for a particular type. The entity object may contain one or more attributes, known as discriminator attributes, that may allow the entity object 528 to designate the particular object type that is currently being operated on. In this example, the discriminator value may be the ExpenseType 530 attribute. The discriminator value is typically set by the presentation tier when a user selects the type of object he or she wishes to create.

In terms of the present example, entity object 528 may have three different underlying object types, which may be referred to as type 1, type 2, and type 3. The type 1 object may be an expense entry that is to be charged internally, the type 2 object may be an expense entry that is to be charged to a customer account, and the type 3 object may be an expense entry that should be billed to a customer address. The particular type of an expense entry may be tracked through the use of the discriminator attribute ExpenseType 530, which determines the particular behavior of the entity object 528.

Entity object 528 may also provide public methods 532 that may invoked by the middle tier to operate on the attributes of the entity object. These public methods may be used to manipulate the attributes of the entity object 528 to accomplish any number of tasks. One exemplary task may be to store the attributes in the data persistence tier. Table 560 may be an example of a table implemented in a relational database to provide persistence for the attribute values of entity object 528. Although presented as a single table in a relational database, this is for purposes of simplicity of explanation. Table 560 is representative of any type of persistent storage, such as multiple tables in a relational database, cross linked tables, flat files, or any other suitable persistent storage.

From table 560, the example depicts six expense entries, two of each type, that are stored in the persistent storage tier. Entries 562 and 564 correspond to a type 1 object, as depicted in Expense Type column 574. Likewise, entries 566 and 568 depict a type 2 object, while entries 570 and 572 depict a type 3 object. It should be noted that for each entry 562-572, only the relevant attributes for that particular type are stored in the persistent storage 560. For example, for entry 562, which is a type 1 entry, there is no data stored for customer information 576, 578, and 580, because those attributes are not relevant for a type 1 object.

Returning to the public methods that may be exposed by the entity object 528, one exemplary method may be a StoreinDB( ) 534 method that may be invoked by the middle tier to store the relevant attributes of the entity object 528 in the persistent storage 560. The middle tier may be responsible for verifying that only valid and relevant data is stored in the persistent storage tier. However, the particular attributes that are relevant for a particular entity object are dependant on the type of the entity object. For example, InternalAcct#520 is relevant for a type 1 object, but is not relevant for a type 2 object. Rather than forcing the entity object 528 to contain methods for processing each possible type, or to contain conditional code for processing each type, the programmatic code is delegated to a singleton helper object 550, 552, 554 that is appropriate for the particular type. Singleton helper objects will be described more fully below with respect to FIG. 5.

Entity object 528 may contain public methods that may be invoked by the middle tier to perform operations on the entity object 528. The middle tier need not be aware of the actual object type that is being represented by entity object 528. The middle tier may simply invoke the public method, and leave the particulars of the operation up to the entity object 528. The public methods of the entity object 528 will typically contain programmatic code to invoke a private method 536 of the entity object 528 to retrieve the appropriate instance of a helper object 550, 552, 554 to process the particular object type. The delegation of the programmatic code to a helper object relieves the middle tier of the responsibility of knowing the particular type of object the entity object 528 is representing. The middle tier simply invokes the public method, and the entity object will determines at runtime the appropriate helper object to utilize.

For example, private method getHelper( ) 538 may be invoked by the public method StoreinDB( ) 534, to retrieve the appropriate helper object 550, 552, 554 to process storing the attributes of the entity object 528 in persistent storage 560. The getHelper( ) 538 method may use the one or more discriminator attributes, such as the ExpenseType 530 attribute, to determine the appropriate helper object. Once the appropriate helper object has been determined, the public method may pass the entire entity object 528 to the helper object for further processing. For example, in some programming languages, this may be accomplished by passing a pointer to "this" of the entity object 528 to the helper object 550, 552, 554.

In some embodiments, the entity object 528 may maintain a pointer to the appropriate helper object as an attribute to avoid having to invoke the getHelper( ) 538 method for every public method invocation of the entity object 528. However, in other embodiments, the helper object is retrieved each time a public method is invoked, thus ensuring that the appropriate helper object is retrieved in cases where the discriminator values have been altered.

Embodiments of the invention thus advantageously allow the entity object to alter its behavior at runtime to behave as any of the possible object types, because the programmatic code for processing the entity object 528 is not contained within the entity object 528, but rather is delegated to a helper object 550, 552, 554 that is retrieved at runtime based on discriminator attributes. If the discriminator attributes are changed, an entirely different helper object may be retrieved, and thus the behavior of the entity object may be completely altered.

Although this example has presented a single public method, StoreinDB( ) 534, it should be clear that this is not intended to limit the public operations to persistently storing the data. The delegation of the programmatic code to helper objects would be equally applicable to any other public methods of the entity object 528. The entity object need only provide methods for performing functions requested by the middle tier. The exact methods that are invoked by the entity object to respond to requests from the middle tier are determined at runtime, based on the discriminator values. Furthermore, although the example has been presented in terms of a single entity object, it should be clear that this is not intended to be limiting. Any number of users may be conducting any number of transactions using the presentation tier. The presentation tier may instantiate any number of entity objects within the middle tier to process those transactions, thus resulting in a plurality of entity objects within the middle tier. The number of concurrently existing entity objects is not limited by embodiments of the invention.

Singleton Helper Objects

Figure 6:
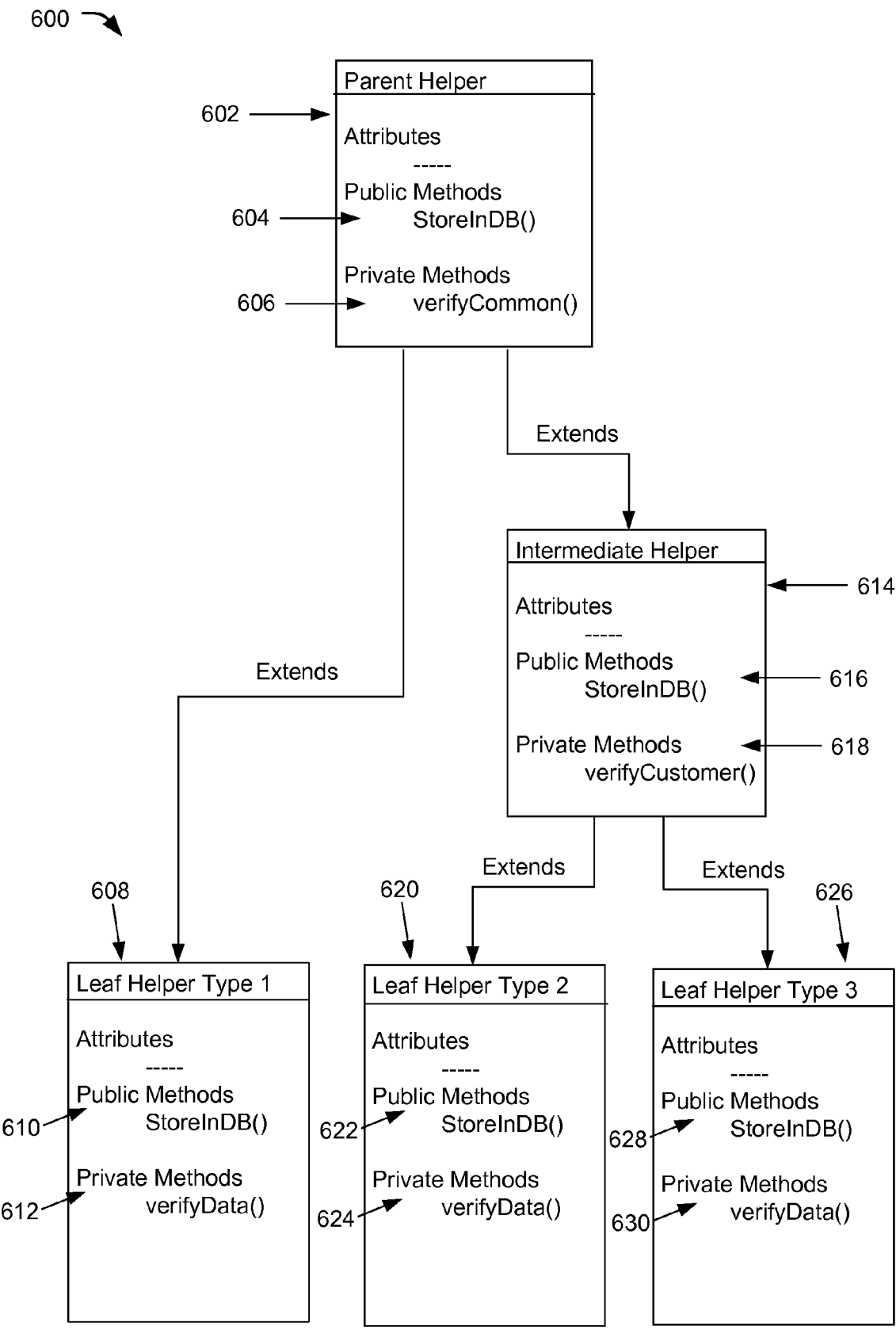
FIG. 6 depicts a tiered hierarchy of helper classes.

FIG. 6 depicts a tiered hierarchy of helper classes, which are used to instantiate helper objects as will be explained further below. A helper class makes use of well known inheritance features of object oriented programming languages. Generally, a class may extend (or inherit from) a base class. Methods that are provided in a parent helper class may be overridden by methods provided by a child class. Similarly, a child class may invoke a method that is provided by the corresponding parent class. By using an inheritance hierarchy, methods that are applicable to multiple helper classes can be included in parent classes that are common to the multiple helper classes. By doing so, the methods only need to be maintained in the parent class, thus reducing code duplication and complexity. Likewise, methods that are only used in a specific helper class are provided at the lowest level of the class hierarchy.

One thing that should be noted about the helper classes, is that the helper classes are stateless. This implies that a helper class contains no attributes, only methods. The reason why helper classes are stateless will be explained further below with respect to the singleton design pattern.

Continuing with the example presented above, class hierarchy 600 may have at its root a parent helper class 602. Typically, parent helper class 602 will provide a public method for all public methods provided by the entity object 528. As will become more clear as the example continues, the public methods provided by the parent helper class may actually just be a stub function used for purposes of compilation time symbol resolution. For example, at compilation time, when the class that defines an entity object refers to the StoreinDB( ) 532 method of the class that defines the helper object, the compiler will be able to resolve this method because a public method StoreinDB( ) 604 exists in the parent helper class. The actual method that may be invoked at runtime may reside in one of the children helper classes that extend the parent helper class, and thus override the StoreinDB( ) 604 method. This is needed, because at compilation time, the particular object type of an entity object instantiated from the entity object class definition is not known.

The parent helper class 602 may also contain private methods that may be used to operate on attributes of the entity object 528 that are applicable across all the types of the entity object. For example, parent helper class 602 may contain a private method called VerifyCommon( ) 606 that may be used to check the validity of attributes that are common across all types of the entity object 528. In the present example, the attributes for ExpenseAmount 516 and description 518 are applicable to all types of the entity object.

Attributes that are only relevant to a specific type of the entity object 528 may be verified by methods that are provided in a child helper class. For example, for a type 1 object, a leaf helper class for a type 1 object 608 may be provided. The leaf helper class 608 may provide a method that overrides the method provided in the parent helper class. For example, leaf helper class 608 may provide its own StoreinDB( ) 610 method. The StoreinDB( ) 610 provided by the leaf helper class 608 will override the method provided by the parent helper class. At run time, the entity object will retrieve the proper instance of a helper object based on the discriminator attributes, and invoke the StoreinDB( ) 610 method provided by the leaf helper class. In other words, the public methods provided by the parent helper class may be used for compilation time consistency, whereas at run time, the public method of the actual leaf helper class will be invoked.

A leaf helper class may also contain methods for verifying attributes that are only relevant to the particular type of the entity object that is handled by the leaf helper class. For example, leaf helper class 608 may contain a verifyData( ) 612 method that may be used to verify attributes that are relevant only to the type 1 object. In this particular example, the only attribute that is relevant only to the type 1 object is the InternalAcct#524. The verifyData( ) 612 method may contain programmatic code to verify that the InternalAcct#attribute has been defined, is of the correct format, etc. In addition, the VerifyData( ) 612 method may also invoke the VerifyCommon( ) 606 method. As is well known in the art of object oriented programming, because the VerifyCommon( ) 606 method of the parent helper class 602 has not been overridden, the VerifyCommon( ) 606 method of the parent helper class may be invoked. So, in other words, the attributes that are relevant to only the particular type of the entity object may be operated on by methods provided by the leaf helper class, while attributes that are relevant to multiple types are operated on by methods provided from a parent class.

To continue with the present example, a user may enter an expense entry of the type 1 variety in the presentation tier by selecting an expense that is to be charged internally. An entity object may be instantiated in the middle tier by the presentation tier to receive the attribute values provided by the presentation tier. The presentation tier may set the discriminator value to indicate a type one object is being entered. The entity object may store the attribute values of the object in the data persistence tier by invoking a method called StoreinDB( ) 532. The StoreinDB( ) 532 method of the instantiated entity object then may invoke a getHelper( ) 536 method of the entity object to retrieve the correct helper object based upon the discriminator attributes. Once the helper object corresponding to the object type specified by the discriminator value has been retrieved, the entity object may invoke the same StoreinDB( ) 612 method of the helper object. However, as explained above, the StoreinDB( ) 604 method may be overridden by a leaf helper class to operate on the particular type of the entity object that is being processed. Thus, the helper object will actually contain the method that was specified in the leaf helper class definition. The leaf helper class may also provide methods to operate on attributes that are relevant to the particular type of the entity object, while also invoking methods inherited from the parent class to operate on attributes that are relevant to a wider scope of types.

In addition to a direct relationship between a parent helper class 602 and a leaf helper class 608, there may also be one or more levels of intermediate classes. For example, intermediate helper class 614 may contain methods to operate on type 2 and type 3 objects of the present example. Just like leaf helper class 608, intermediate helper class 614 may also provide methods, such as the StoreinDB( ) 616 method, that may be overridden by children helper classes. Intermediate helper class 614 may also provide methods that are applicable to more than one type of the entity object.

In terms of the present example, intermediate helper class 614 may provide a verifyCustomer( ) 618 method that verifies the attributes that are common to type 2 and type 3 objects. For example, the CustomerName 522 attribute is necessary for both type 2 and type 3 objects. Rather than provide duplicate identical methods for verifying this attribute in each of leaf helper classes 620, 626, one method may be provided in the intermediate helper class 618. Leaf helper classes 620, 626 may also provide methods 622, 628 that override the methods provided by either the intermediate 614 or parent helper 602 class. Leaf helper class 620, 626 may also provide methods for operating on attributes that are only relevant to the particular type of the entity object. Attributes that are relevant to multiple types, or to all types, may be verified by invoking methods provided by the helper classes that are further up in the hierarchy.

In the current example, the CustomerAcct#attribute is only relevant to type 2 objects, while the CustomerAddress attribute is only relevant to type 3 objects. As such, the leaf helper classes 620, 626 may only contain methods that operate on attributes relevant to that particular type. Attributes that are relevant to a wider range of types, such as the CustomerName 522 may be operated on by invoking methods provided by the intermediate helper class. Attributes that are relevant across all types may be operated on by invoking methods provided by the parent helper class. Although FIG. 6 depicts a three level hierarchy, embodiments of the invention are not so limited. Any number of levels of an inheritance hierarchy have been contemplated.

As briefly mentioned above, helper objects are instantiated as singleton objects. This means that regardless of how many entity objects may have been instantiated in the middle tier, there will be only one instance of a helper object for each object type of the entity object. The getHelper( ) 538 method of the entity object may determine if an instance of the helper object has already been instantiated. If it has, the getHelper( ) 538 method may retrieve a pointer, or other such indicator, to the already instantiated helper object. If the helper object does not already exist, the getHelper( ) 538 method may create an instance of the helper object. In other embodiments of the invention, instantiation of the helper object, if needed, may occur in any of the methods provided by the entity object. The concept to be understood is that there will only exist a single instance of a helper object in the middle tier for each object type. Regardless of the number of entity objects that are instantiated, they will all share the same set of helper objects that are instantiated for each type.

Figure 7:
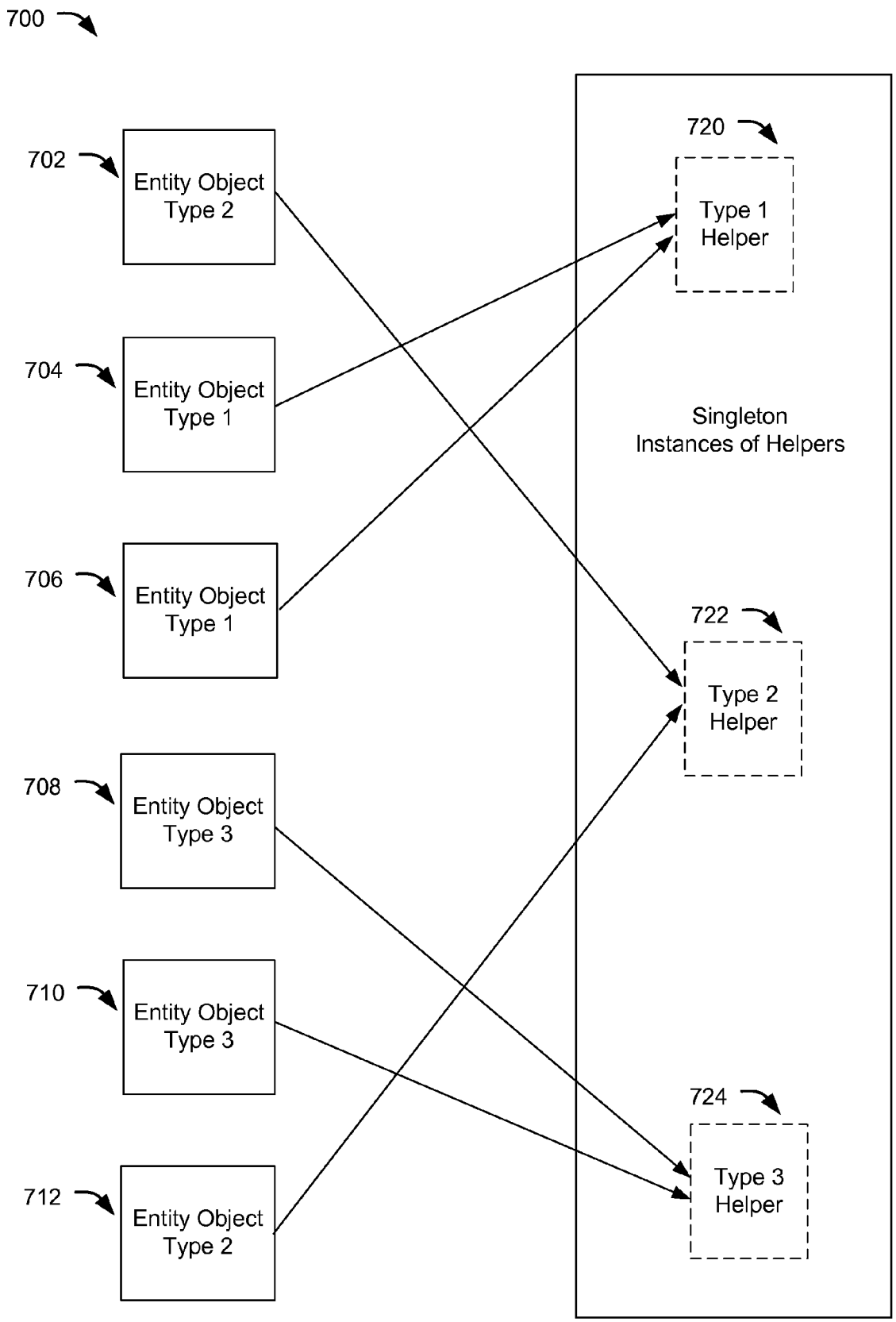
FIG. 7 depicts a simplified entity object to singleton helper object relationship.

FIG. 7 depicts a simplified entity object to singleton helper object relationship. Entity objects 702, 704, 706, 708, 710, 712 may be instantiated in the middle tier. However, there is only one instance of the helper object 720, 722, 724 for each particular object type. Thus, a single instance of the helper object 720, 722, 724 may be used to operate on many different instances of the entity object. For example, FIG. 7 depicts two instantiated entity objects 704, 706 of the type 1 variety. However, there will only be one instance of a type 1 helper object 720, that will be shared by entity objects 704, 706. This is possible because the helper objects are stateless.

As depicted throughout FIG. 6, helper objects contain methods only, and do not contain any attributes. As such, the helper object is not capable of maintaining a state, as it has no attributes in which to store a state. When an entity object utilizes a helper object to process the attributes of the entity object, a pointer, or some similar mechanism, may be employed to pass the entire entity object to the helper object. Typically, this may be accomplished by passing a "this" pointer from the invoking entity object to the invoked helper object. Through the use of the "this" pointer, the helper object may manipulate the attributes of the entity object, and any necessary state information may be maintained in the entity object itself.

The use of stateless, singleton, helper objects is advantageous for any number of reasons. Because the helper object is not required to maintain any state information for the entity object, design and implementation of the helper object is simplified. Furthermore, because there is only one instance of the helper object, memory and overhead within the middle tier can be reduced. The reduction is due in part to the efficiencies gained by not requiring each entity object to instantiate its own copy of a helper object, as all entity objects can share the same set of instances of the helper objects.

Attribute Relevance Framework

As has been briefly referred to throughout the specification, some attributes of an entity object are only relevant for certain types of the entity object. For example, in the type 1 object of the entity object depicted in FIG. 6, the attribute for InternalAcct#220 is only relevant for the type 1 object. The type 2 and 3 objects of the entity object do not require this particular attribute. Embodiments of the present invention advantageously provide for an attribute relevance framework that may be implemented as part of the helper objects. In some embodiments, the helper objects may null out values for attributes that are not relevant to a particular type of the entity object. In the ongoing example, if a type 1 object of the entity object invokes the type 1 helper object, the type 1 helper object may examine all attributes present in the entity object. As mentioned above, this is accomplished by passing a "this" pointer to the helper object.

The helper object may then examine all of the attributes to determine is there are values present for attributes that are not relevant for the particular type of the entity object that is being operated on by the helper object. For example, the helper object for the type 1 object may examine the CustomerName 222 attribute of the entity object. For a type 1 object, the CustomerName attribute is not needed, and as such, is not relevant. Embodiments of the invention may null out this attribute prior to storing the entity object within the persistence tier. In other embodiments, instead of, or in addition to, replacing irrelevant attributes with a null value, an ATTRIBUTE_RELEVANCY_EXCEPTION may be thrown. Such an exception may allow the developer to gain visibility with respect to irrelevant attributes that are being set somewhere in the system, and corrective action can be taken to remove the computer code that is causing this.

The ability to discover attributes that are irrelevant, and either clear the values, or notify the developers advantageously allows for the data that is stored in the data persistence tier to be more accurate. Furthermore, external applications that may access the data stored in the persistence tier may be assured that the data that is present is all relevant for a particular object type that is being operated on.

Figure 8:
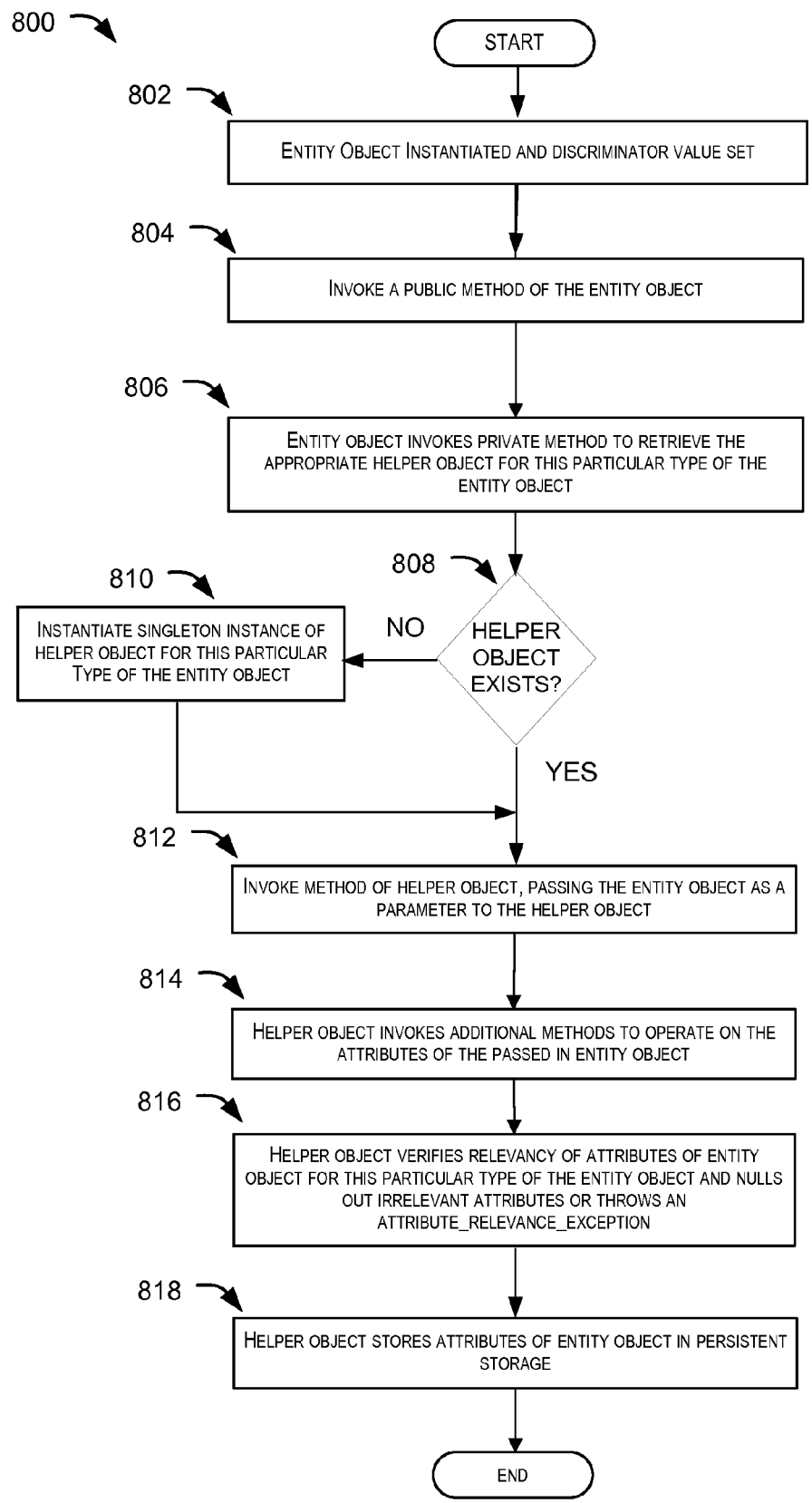
FIG. 8 depicts a simplified flowchart showing a method of using a mutating polymorphic entity object to access a data store.

FIG. 8 depicts a simplified flowchart showing a method of using a mutating polymorphic entity object to access a data store. Method 800 may begin at step 802, wherein an entity object is instantiated from the class definition of the entity object. The entity object may be instantiated in response to a user utilizing the presentation tier to enter data. The presentation tier may receive the data from the user, and based on the type of object selected by the user, may set the discriminator value of the entity object.

At step 804 a public method of an entity object may be invoked. In one embodiment, the public method may be invoked by the middle tier to perform some operation on the entity object. One exemplary method may be a method that is invoked to store the attributes of the entity object into persistent storage. At step 806, the entity object may invoke a private method to retrieve the appropriate instance of a helper object to process the particular type of the entity object that is specified by the discriminator value. The private method of the entity object is able to access the discriminator attribute of the entity object to determine the particular object type of the entity object, because the discriminator attribute is one of the attributes of the entity object.

At step 808 the entity object may determine if the instance of the helper object already exists by calling a getInstance method of the helper object. If it does, getInstance will return the singleton helper object and the method continues on to step 812. If an instance of the appropriate helper object does not exist, the method may move to step 810, where a singleton instance of the helper object for the particular type is instantiated by the getInstance method. As explained above, there will only be one instance of a helper object for each particular type within the entire middle tier. The use of a getInstance method in a singleton design pattern is well known, although any other methods of ensuring a singleton helper object are equally suitable.

At step 812 a method of the helper object may be invoked. As part of the invocation of the helper object method, a pointer to the entity object will be passed to the helper object. Typically, this may be a pointer to "this" of the entity object. At step 814 the helper object may invoke additional methods to operate on the attributes of the passed in entity object. In some cases, the helper object may invoke methods that are inherited from a parent helper class, while in other cases, the helper object may invoke methods that are overridden from the parent helper class.

At step 816 the helper object may verify the relevancy of the attributes of the passed in entity object. This may be accomplished by examining the attributes of the passed in entity object, and determining any values that are not relevant to the particular type of the entity object being operated on. In some embodiments, the helper object may null out irrelevant attributes, while in other embodiments, the helper object may throw an ATTRIBUTE_RELEVANCY_EXCEPTION if irrelevant attributes are present. The decision to null out irrelevant attributes, throw an exception, or perform some other action is left up to the designer of the application. At step 818 the attributes of the entity object may be stored in persistent storage.

Figure 9:
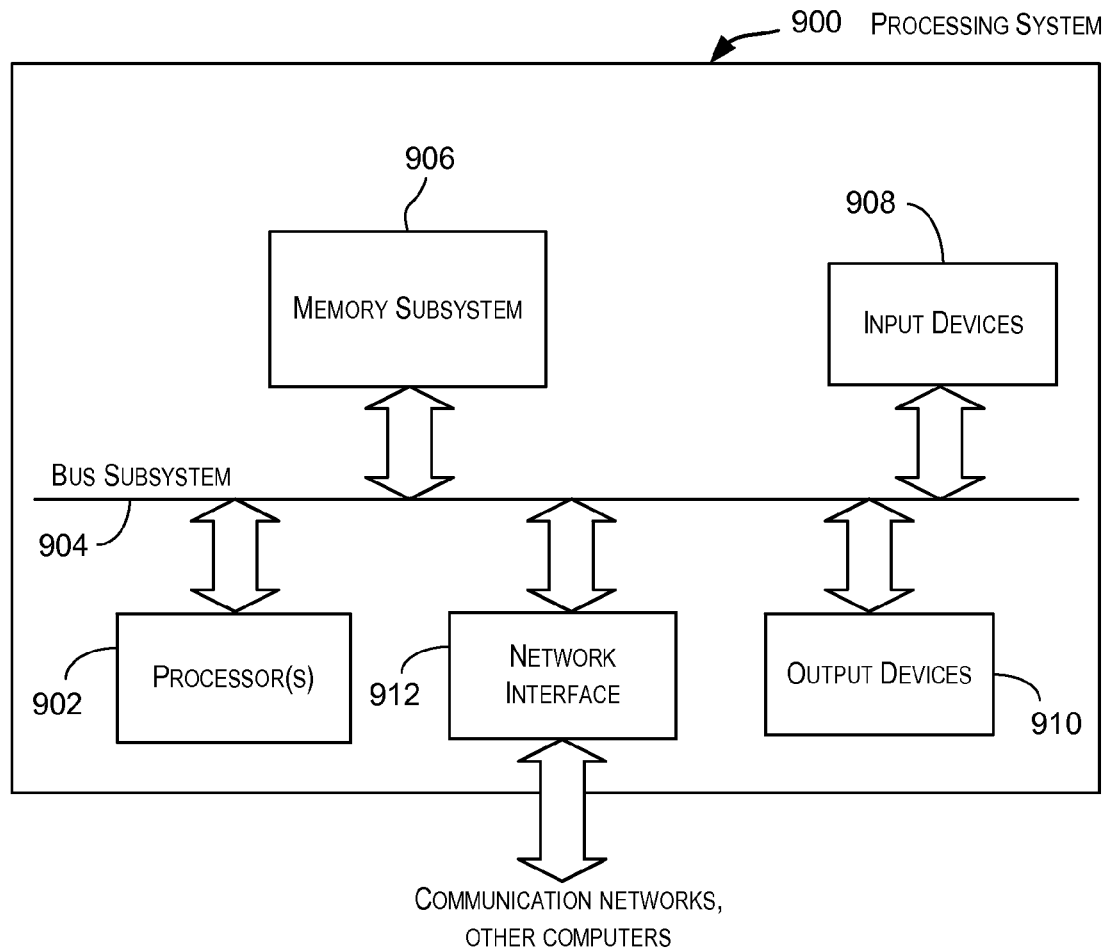
FIG. 9 is a simplified block diagram of a processing system that may be used to practice an embodiment of the present invention.

FIG. 9 is a simplified block diagram of a processing system 900 that may be used to practice an embodiment of the present disclosure. System 900 may be a utilized in any combination of the presentation, verification and validation, or persistence tiers. System 900 may be configured to perform the processing depicted in FIG. 8 and described above.

As shown in FIG. 9, system 900 includes a processor 902 that communicates with a number of peripheral devices via a bus subsystem 904. These peripheral devices may include a memory subsystem 906, input devices 908, output devices 910, and a network interface subsystem 912. Bus subsystem 904 provides a mechanism for letting the various components and subsystems of system 900 communicate with each other as intended. Although bus subsystem 904 is shown schematically as a single bus, alternative embodiments of the bus subsystem may utilize multiple busses.

Processor 902 is configured to perform processing performed by system 900. For example, processor 902 may be configured to execute programs, code, or instructions to perform operations according to an embodiment of the present invention. Processor 902 may also control other subsystems or devices.

Input devices 908 enable a user to interact with and provide information to system 900. Input devices 908 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 900. Input devices 908 typically allow a user to select objects, icons, text and the like that appear on a monitor via a command such as a click of a button or the like.

Output devices 910 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 900.

Network interface subsystem 912 provides an interface to other computer systems, and networks. Network interface subsystem 912 serves as an interface for receiving data from other sources and for transmitting data to other sources from system 900. Embodiments of network interface subsystem 912 include an Ethernet card, a modem (telephone, satellite, cable, ISDN, etc.), (asynchronous) digital subscriber line (DSL) units, FireWire interface, USB interface, and the like. For example, subsystem 912 may be coupled to a computer network, to a FireWire bus, or the like. In other embodiments, network interface subsystem 912 may be physically integrated on the motherboard of system 900, and may be a software program, such as soft DSL, or the like.

Memory subsystem 906 provides a computer readable medium for storing the basic programming and data constructs that provide the functionality of the present invention. For example, memory subsystem 906 may provide a computer-readable medium for a program, code modules, or instructions implementing the functionality of the present invention. These software modules may be executed by processor(s) 902. Memory subsystem 906 may also provide a repository for storing other data used in accordance with the present invention.

Memory subsystem 906 may include a number of memories including a main random access memory (RAM) for storage of instructions and data during program execution and a read only memory (ROM) in which fixed instructions are stored. RAM is generally semiconductor-based memory that can be read and written by processor 902. The storage locations can be accessed in any order. RAM is generally understood to refer to volatile memory that can be written to as well as read. There are various different types of RAM.

Memory subsystem 906 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 900 can be of various types including a personal computer, a portable computer, a workstation, a network computer, a mainframe, a kiosk, or any other data processing system. Due to the ever-changing nature of computers and networks, the description of system 900 depicted in FIG. 9 is intended only as a specific example for purposes of illustrating the preferred embodiment of a processing system. Many other configurations having more or fewer components than the system depicted in FIG. 9 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc., and the like. Further, use of different types of operating systems is contemplated, such as Windows®, WindowsXP®, WindowsNT®, or the like from Microsoft Corporation, Solaris from Sun Microsystems, LINUX, UNIX, and the like.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer readable storage medium storing a plurality of instructions for controlling a processor, the plurality of instructions comprising:

instructions that cause the processor to create an entity object that comprises a set of attributes and behaviors, the set of attributes including a superset of all attributes of a plurality of object types, the set of behaviors further including a superset of all behaviors of the plurality of object types, the set of attributes further including a discriminator attribute that determines an object type of the plurality of object types that the entity object will behave as;

instructions that cause the processor to set a value for the discriminator attribute based on the object type that the entity object should behave as;

instructions that cause the processor to, in response to a request for the entity object to exhibit a behavior, obtain a reference to a helper object, the helper object implementing the behavior that enables the entity object to behave as an object of the object type determined by the discriminator attribute value;

instructions that cause the processor to execute computer code of the helper object that implements the requested behavior of the entity object for the determined object type;

instructions that cause the processor to obtain a reference to the helper object by determining if an instance of the helper object is currently instantiated, and if not, instantiating the helper object;

instructions that cause the processor to obtain the reference to the helper object for each request for the entity object to exhibit a behavior; and instructions that cause the processor to determine if the set of attributes of the entity object comprises an attribute with an associated value, wherein the attribute is not included in one or more attributes corresponding to an object type determined by the discriminator attribute value.

2. The computer readable storage medium of claim 1 further including instructions that cause the processor to null out the associated value for the attribute of the entity object that is not included in the one or more attributes.

3. The computer readable storage medium of claim 1 further including instructions that cause the processor to throw an ATTRIBUTE_RELEVANCE_EXCEPTION for the attribute of the entity object that is not included in the one or more attributes.

4. The computer readable storage medium of claim 1, wherein each object type of the plurality of object types has a corresponding helper object.

5. The computer readable storage medium of claim 4, wherein each helper object corresponding to each type of the plurality of object types is defined by a leaf class, each leaf class inheriting from at least one parent helper class.

6. The computer readable storage medium of claim 5 wherein the parent helper class contains at least a behavior signature that matches every behavior of the entity object, such that at compilation time all symbols are resolved.

7. The computer readable storage medium of claim 6 wherein the parent helper class implements all behaviors that are common to all leaf helper classes, such that the common behaviors are not implemented in the leaf helper classes.

8. The computer readable storage medium of claim 7 wherein the inheritance hierarchy from the parent helper class to the leaf helper class can include a plurality of intermediate helper classes, the intermediate helper classes implementing behaviors that are common to at least two leaf helper classes.

9. The computer readable storage medium of claim 8 further including instructions that cause the processor to store values for the set of attributes of the entity object into a persistent data store.

10. A method accessing a data store, the method comprising:

creating, with one or more processors associated with one or more computer systems, an entity object that comprises a set of attributes and behaviors, the set of attributes including a superset of all attributes of a plurality of object types, the set of behaviors further including a superset of all behaviors of the plurality of object types, the set of attributes further including a discriminator attribute that determines an object type of the plurality of object types that the entity object will behave as;

setting, with the one or more processors associated with the one or more computer systems, a value for the discriminator attribute based on the object type that the entity object should behave as;

obtaining, with the one or more processors associated with the one or more computer systems, a reference to a helper object in response to a request for the entity object to exhibit a behavior, the helper object implementing the behavior that enables the entity object to behave as an object of the object type determined by the discriminator attribute value;

executing, with the one or more processors associated with the one or more computer systems, computer code of the helper object that implements the requested behavior of the entity object for the determined object type;

obtaining, with the one or more processors associated with the one or more computer systems, a reference to the helper object by determining if an instance of the helper object is currently instantiated, and if not, instantiating the helper object;

obtaining, with the one or more processors associated with the one or more computer systems, the reference to the helper object for each request for the entity object to exhibit a behavior; and determining, with the one or more processors associated with the one or more computer systems, if the set of attributes of the entity object comprises an attribute with an associated value, wherein the attribute is not included in one or more attributes corresponding to an object type determined by the discriminator attribute value.

11. The method of claim 10 further comprising nulling out the associated value for the attribute of the entity object that is not included in the one or more attributes.

12. The method of claim 10 further comprising throwing an ATTRIBUTE_RELEVANCE_EXCEPTION for the attribute of the entity object that is not included in the one or more attributes.

13. The method of claim 10, wherein each object type of the plurality of object types has a corresponding helper object.

14. The method of claim 13, wherein each helper object corresponding to each type of the plurality of object types is defined by a leaf class, each leaf class inheriting from at least one parent helper class.

15. The method of claim 14, wherein the parent helper class contains at least a behavior signature that matches every behavior of the entity object, such that at compilation time all symbols are resolved.

16. The method of claim 15, wherein the parent helper class implements all behaviors that are common to all leaf helper classes, such that the common behaviors are not implemented in the leaf helper classes.

17. The method of claim 16, wherein the inheritance hierarchy from the parent helper class to the leaf helper class can include a plurality of intermediate helper classes, the intermediate helper classes implementing behaviors that are common to at least two leaf helper classes.

18. The method of claim 17, further comprising storing values for the set of attributes of the entity object into a persistent data store.

19. A system for accessing a data store, the system comprising:

a processor; and a memory coupled to the processor;

wherein the processor is configured to:

create an entity object that comprises a set of attributes and behaviors, the set of attributes including a superset of all attributes of a plurality of object types, the set of behaviors further including a superset of all behaviors of the plurality of object types, the set of attributes further including a discriminator attribute that determines an object type of the plurality of object types that the entity object will behave as;

set a value for the discriminator attribute based on the object type that the entity object should behave as;

obtain a reference to a helper object in response to a request for the entity object to exhibit a behavior, the helper object implementing the behavior that enables the entity object to behave as an object of the object type determined by the discriminator attribute value;

execute computer code of the helper object that implements the requested behavior of the entity object for the determined object type;
obtain a reference to the helper object by determining if an instance of the helper object is currently instantiated, and if not, instantiating the helper object;
obtain the reference to the helper object for each request for the entity object to exhibit a behavior; and determine if the set of attributes of the entity object comprises an attribute with an associated value, wherein the attribute is not included in one or more attributes corresponding to an object type determined by the discriminator attribute value.

* * * * *

UNITED STATES PATENT AND TRADEMARK OFFICE
CERTIFICATE OF CORRECTION

| | |
|---|---|
| PATENT NO. | : 8,407,257 B2 |
| APPLICATION NO. | : 12/562056 |
| DATED | : March 26, 2013 |
| INVENTOR(S) | : Nama et al. |

It is certified that error appears in the above-identified patent and that said Letters Patent is hereby corrected as shown below:

In the Specification:

In column 8, line 59, delete "indentified" and insert -- identified --, therefor.

Signed and Sealed this
Ninth Day of July, 2013

Teresa Stanek Rea
*Acting Director of the United States Patent and Trademark Office*